US00RE40027E

(19) United States
(12) Reissued Patent
Matthews

(10) Patent Number: US RE40,027 E
(45) Date of Reissued Patent: Jan. 22, 2008

(54) FLASHLIGHTS AND OTHER BATTERY-POWERED APPARATUS FOR HOLDING AND ENERGIZING TRANSDUCERS

(75) Inventor: John Wallace Matthews, Corona del Mar, CA (US)

(73) Assignee: Surefire, LLC, Fountain Valley, CA (US)

(21) Appl. No.: 10/658,851

(22) PCT Filed: Nov. 24, 1992

(86) PCT No.: PCT/US92/10209

§ 371 (c)(1),
(2), (4) Date: Jan. 3, 1995

(87) PCT Pub. No.: WO94/13022

PCT Pub. Date: Jun. 9, 1994

Related U.S. Patent Documents

Reissue of:
(64) Patent No.: 5,629,105
Issued: May 13, 1997
Appl. No.: 08/367,170
Filed: Jan. 3, 1995

(51) Int. Cl.
*H01M 2/10* (2006.01)
*F21L 4/02* (2006.01)
*H01H 9/20* (2006.01)

(52) U.S. Cl. ..... 429/97; 200/50.04; 200/60; 362/183; 362/184; 362/194; 362/205; 362/206

(58) Field of Classification Search ..... 362/183, 362/184, 185, 194, 204, 205, 206; 429/97, 429/123; 200/11 R, 50.05, 60
See application file for complete search history.

(56) References Cited

U.S. PATENT DOCUMENTS 1,403,538 A * 1/1922 Burgess ..... 362/187
1,423,911 A 7/1922 Cardwell
1,433,570 A * 10/1922 Stimson ..... 362/187
1,603,272 A * 10/1926 Eaton ..... 362/187
1,661,784 A * 3/1928 Blake ..... 362/187
1,669,292 A * 5/1928 Eckstein ..... 362/188
1,671,623 A * 5/1928 Barany ..... 200/60
1,674,650 A * 6/1928 Leser ..... 362/188
1,680,169 A * 8/1928 Osean ..... 362/188
1,680,188 A * 8/1928 Weber ..... 362/205
1,781,064 A * 11/1930 Jones ..... 362/187
1,823,762 A * 9/1931 Rathmann ..... 362/188
1,955,511 A * 4/1934 Muros ..... 362/202
2,016,819 A * 10/1935 Meginniss ..... 362/158
2,020,352 A * 11/1935 Bolduc ..... 362/205
2,097,222 A * 10/1937 Spender et al. ..... 362/187
2,125,038 A * 7/1938 Holihan et al. ..... 362/188
2,176,084 A * 10/1939 Lennan ..... 200/302.2

(Continued)

FOREIGN PATENT DOCUMENTS

AU 138873 * 4/1984

(Continued)

*Primary Examiner*—Stephen J. Kalafut

(57) ABSTRACT

A battery-powered apparatus for holding and energizing an electric transducer, includes a hand-held battery housing carrying the transducer mount, and first and second internal battery contacts. A first external battery charge terminal is on the transducer mount, and a second external battery charge terminal is on a part of the battery housing, such as its end cap. A double-throw switch has a common element electrically connected to an internal battery terminal contact, has a first switched contact leading to a first terminal of the electric transducer, and has opposite second switched contact electrically connected to an external battery charge terminal. If there are two electric transducers, they may be a part of a light source comprising a reflector, a first electric lamp having a filament at its focal point, and a second electric lamp extending into that reflector beside the first electric lamp.

83 Claims, 5 Drawing Sheets

U.S. PATENT DOCUMENTS 2,225,936 A * 12/1940 Williams ..... 362/206
2,245,707 A * 6/1941 Packer ..... 362/184
2,255,291 A * 9/1941 Larson ..... 362/185
2,259,106 A * 10/1941 Hager ..... 200/60
2,338,078 A * 12/1943 Wood ..... 362/187
2,339,356 A * 1/1944 Sachs ..... 362/187
2,385,639 A * 9/1945 Packer et al. ..... 362/196
2,439,496 A * 4/1948 Szantay ..... 362/205
2,461,118 A * 2/1949 Lippincott ..... 362/205
2,490,830 A * 12/1949 Norton ..... 362/205
2,503,287 A * 4/1950 Moore ..... 200/60
2,518,437 A * 8/1950 Amstutz ..... 362/205
2,520,023 A * 8/1950 Allen ..... 362/184
2,530,913 A * 11/1950 Shackel ..... 362/205
2,599,295 A * 6/1952 Thomas ..... 200/60
2,769,896 A * 11/1956 Lambert ..... 362/205
2,797,309 A * 6/1957 Dulberg ..... 362/203
2,830,280 A * 4/1958 Webber ..... 439/679
2,852,632 A * 9/1958 Garland ..... 200/60
2,852,633 A * 9/1958 Garland ..... 200/60
2,876,410 A * 3/1959 Fry ..... 320/111
2,897,345 A * 7/1959 Meager et al. ..... 362/158
2,915,621 A * 12/1959 Garland ..... 362/205
2,931,005 A * 3/1960 Saurwein et al. ..... 439/660
2,945,944 A * 7/1960 Flowers ..... 362/188
3,014,125 A * 12/1961 Draudt ..... 362/205
3,111,277 A 11/1963 Grimsley
3,226,538 A * 12/1965 Bustamante ..... 362/184
3,250,911 A * 5/1966 Oldenburger ..... 362/183
3,521,050 A * 7/1970 Shagena, Jr. ..... 362/183
3,701,862 A * 10/1972 Vignini ..... 429/97
3,717,759 A * 2/1973 Rousseau ..... 362/186
3,798,440 A * 3/1974 Brindley ..... 362/205
3,825,740 A * 7/1974 Friedman et al. ..... 362/183
3,835,272 A * 9/1974 Wisenbaker ..... 200/60
3,924,116 A * 12/1975 Brindley ..... 362/158
3,924,117 A * 12/1975 Brindley ..... 362/191
RE29,047 E * 11/1976 Brindley ..... 362/205
4,092,580 A * 5/1978 Prinsze ..... 320/115
4,135,230 A * 1/1979 Armbruster ..... 362/206
4,151,583 A * 4/1979 Miller ..... 362/205
4,171,534 A * 10/1979 Strowe ..... 362/183
4,203,150 A * 5/1980 Shamlian ..... 362/183
4,234,913 A * 11/1980 Ramme ..... 362/158
4,244,011 A * 1/1981 Hammel et al. ..... 362/183
4,261,026 A * 4/1981 Bolha ..... 362/101
4,281,368 A * 7/1981 Humbert ..... 362/100
4,286,311 A * 8/1981 Maglica ..... 362/205
D263,170 S * 2/1982 Maglica ..... D26/49
4,327,401 A * 4/1982 Siiberg ..... 362/183
4,329,740 A * 5/1982 Colvin ..... 362/184
4,345,304 A * 8/1982 Penney et al. ..... 362/183
4,357,648 A * 11/1982 Nelson ..... 362/183
4,388,673 A * 6/1983 Maglica ..... 362/183
4,398,139 A * 8/1983 Prinsze ..... 320/114
4,398,238 A * 8/1983 Nelson ..... 362/187
4,429,351 A * 1/1984 Petzl et al. ..... 362/187
4,441,142 A * 4/1984 Garofalo ..... 362/158
4,463,283 A * 7/1984 Penney et al. ..... 315/87
4,472,766 A * 9/1984 Hung ..... 362/158
4,495,551 A * 1/1985 Foltz ..... 362/205
4,502,102 A * 2/1985 Phipps ..... 362/183
4,514,790 A * 4/1985 Will ..... 362/183
4,527,223 A * 7/1985 Maglica ..... 362/187
4,530,034 A * 7/1985 Kawarada ..... 362/9
4,531,178 A * 7/1985 Uke ..... 362/158
4,577,263 A * 3/1986 Maglica ..... 362/187
4,581,686 A * 4/1986 Nelson ..... 362/204
4,605,993 A * 8/1986 Zelina, Jr. ..... 362/183
4,640,258 A * 2/1987 Penney et al. ..... 124/24.1
4,656,565 A * 4/1987 Maglica ..... 362/187
4,658,336 A * 4/1987 Maglica ..... 362/197
4,725,932 A * 2/1988 Gammache ..... 362/202
4,733,337 A * 3/1988 Bieberstein ..... 362/206
4,760,504 A * 7/1988 Schaller et al. ..... 362/205
D297,828 S * 9/1988 Bromley et al. ..... D13/108
4,777,582 A * 10/1988 Sharrah ..... 362/205
D298,748 S * 11/1988 Sharrah et al. ..... D13/108
4,783,725 A 11/1988 Schaller et al. ..... 362/157
4,788,633 A * 11/1988 Zimermann et al. ..... 362/296
4,803,605 A * 2/1989 Schaller et al. ..... 362/184
4,819,141 A * 4/1989 Maglica et al. ..... 362/207
4,823,242 A * 4/1989 Maglica et al. ..... 362/187
4,825,345 A * 4/1989 Stevens ..... 362/183
4,841,417 A * 6/1989 Maglica et al. ..... 362/206
4,843,298 A * 6/1989 Brauch et al. ..... 320/115
4,851,974 A * 7/1989 Maglica ..... 362/187
D303,107 S * 8/1989 Maglica et al. ..... D13/120
4,864,474 A * 9/1989 Maglica ..... 362/203
4,876,416 A * 10/1989 Frantz et al. ..... 200/11 R
4,885,668 A * 12/1989 Maglica et al. ..... 382/345
4,888,670 A * 12/1989 Sharrah ..... 362/205
4,899,265 A * 2/1990 Maglica ..... 362/187
D306,492 S * 3/1990 Sharrah ..... D26/49
D307,488 S * 4/1990 Sharrah ..... D26/49
4,914,555 A * 4/1990 Gammache ..... 362/183
D308,109 S * 5/1990 Maglica et al. ..... D26/49
4,942,505 A * 7/1990 Maglica ..... 362/187
D310,425 S * 9/1990 Sharrah ..... D26/49
4,956,755 A * 9/1990 Maglica et al. ..... 362/206
D312,509 S * 11/1990 Sharrah ..... D26/49
5,003,440 A * 3/1991 Maglica ..... 362/158
5,008,785 A * 4/1991 Maglica et al. ..... 362/183
D324,430 S * 3/1992 Sharrah et al. ..... D26/46
5,113,326 A * 5/1992 Maglica ..... 362/158
5,143,441 A * 9/1992 Maglica ..... 362/203
5,158,358 A * 10/1992 Maglica et al. ..... 362/206
5,161,095 A * 11/1992 Gammache ..... 362/197
5,171,086 A * 12/1992 Baloochi ..... 362/188
5,203,624 A * 4/1993 Schier et al. ..... 362/158
5,359,779 A 11/1994 Polk et al. ..... 33/241
5,422,798 A * 6/1995 Osiecki et al. ..... 362/206

FOREIGN PATENT DOCUMENTS

FR 1271830 * 8/1961
FR 1430456 * 1/1966
FR 1430546 * 1/1966
FR 2372382 * 6/1978
GB 411218 * 6/1934
GB 555910 * 9/1943
GB 586357 * 3/1947
GB 752619 * 7/1956

* cited by examiner

FIG. 3
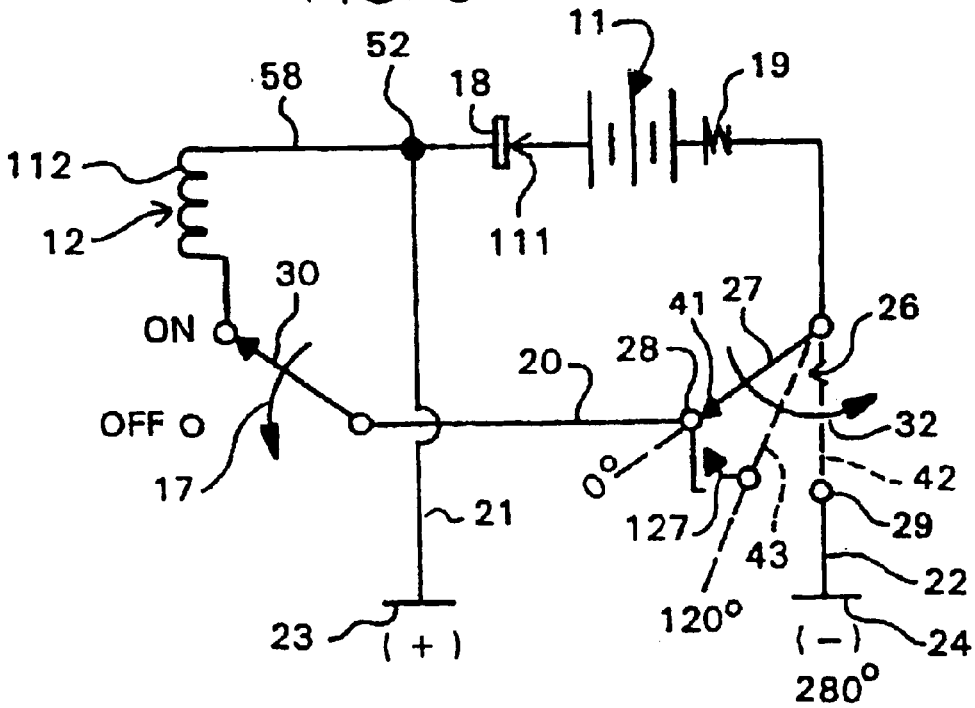
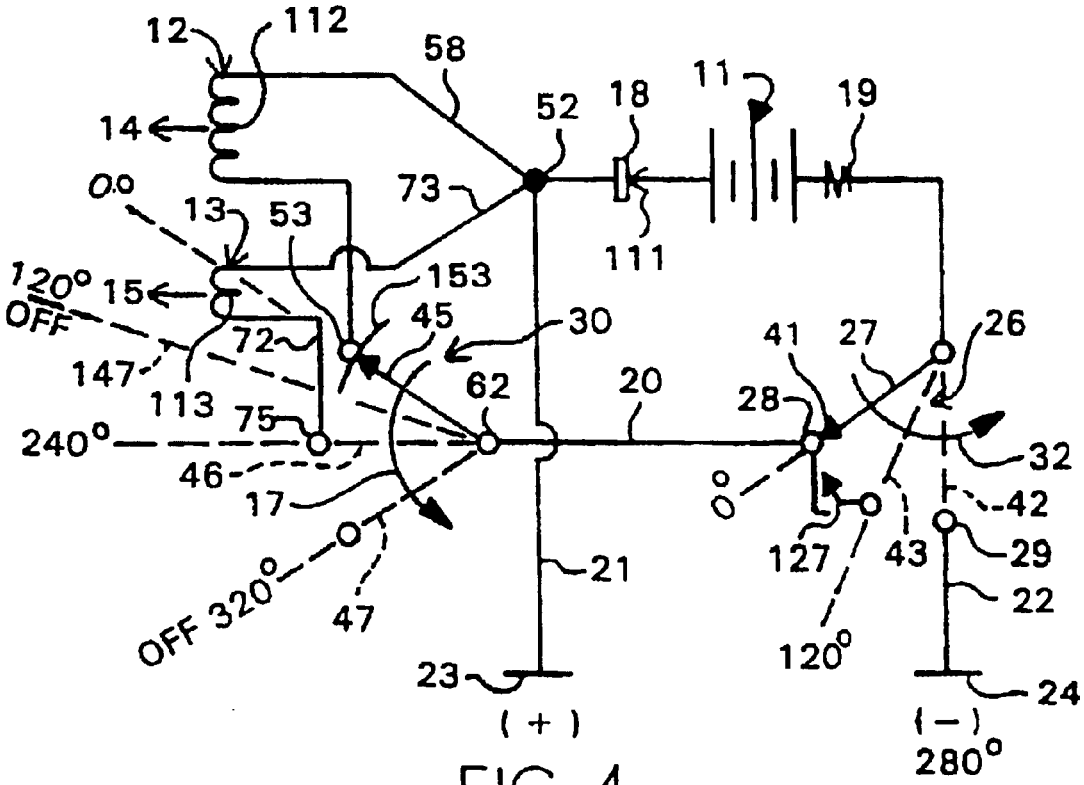
FIG. 4

FLASHLIGHTS AND OTHER BATTERY-POWERED APPARATUS FOR HOLDING AND ENERGIZING TRANSDUCERS

Matter enclosed in heavy brackets [ ] appears in the original patent but forms no part of this reissue specification; matter printed in italics indicates the additions made by reissue.

TECHNICAL FIELD

The subject inventions relate to flashlights and other battery-powered apparatus for holding and energizing electric transducers.

BACKGROUND

Battery-Powered apparatus for holding and energizing one or more electric transducers are well known and include flashlights, laser pointers, and electrically powered tools, to name a few examples.

Prior-art apparatus with rechargeable batteries for powering one or more electric light sources or other transducers either exposed transducers to battery charging currents, especially if the user accidentally turned on a transducer energizing switch, or imposed charging current limitations by charging the batteries through a flashlight filament or other active electric transducer part, or required the provision of special isolated electrodes, wires and the like for feeding battery charging currents through apparatus parts, or exposed battery chargers to shorting through faulty positioning of switches on the apparatus, or had two or more of such drawbacks.

There also is a need for improved switching equipment that can handle selective switching of transducer energizing circuits and of battery charging circuits in battery powered apparatus, and that can perform other switching functions.

There similarly is a need for improved switching equipment that can handle selective energization of at least two electric transducers or other loads.

Especially hand-held light sources with two filaments or lamps typically will produce a well-focused narrow beam from one filament and a very poorly focused irregular beam with dark rings and spots from the other filament, whereas the need is to produce not only a well-focused narrow beam from the higher power lamp, but also a well-focused broad beam 15 from the lower powered lamp.

There also is a need for improved transducer mounts or housing in battery-powered apparatus.

With prior-art flashlights, it is often difficult to retain a well-focused light output when a light source is replaced. Also prior-art flashlights often are impaired by a deteriorating performance because of progressively corroding switch contacts and battery terminal contacts.

DISCLOSURE OF INVENTIONS

It is an object of one of the inventions herein disclosed and claimed to provide improved rechargeable battery-powered apparatus for holding and energizing at least one electric transducer, wherein any transducer is isolated from battery chargers and charging currents, whereby transducers are protected and charging current limitations imposed by transducers are avoided, and wherein battery charging currents are led through parts of the apparatus without the need of any electrodes, wires and the like that would have to be electrically insulated from the apparatus part through which the particular electrode or wire proceeds.

According to one of the inventions herein disclosed, that object is met by battery-powered apparatus for holding and energizing an electric transducer producing an output from a battery current, comprising, in combination, a transducer mount, a hand-held battery housing carrying the transducer mount, a first internal battery terminal contact at the transducer mount, a second internal battery terminal contact remote from the transducer mount, a first external battery charge terminal on the transducer mount, a second external battery charge terminal on a part of the battery housing, a double-throw switch having a common element electrically connected to one of the first and second internal battery terminal contacts, having a first switched contact leading to a first terminal of the electric transducer, and having an opposite second switched contact electrically connected to one of the first and second external battery charge terminals, an actuator for that switch including one of (a) the transducer mount and (b) the above-mentioned part of the battery housing, movable relatively to each other, and current-conducting paths between the other of the first and second internal battery terminal contacts and the other of the first and second external battery charge terminals and a second terminal of the electric transducer.

It is an object of an invention herein disclosed and claimed to provide improved battery-powered apparatus for holding and energizing a first electric transducer producing a first output, and a second electric transducer producing a different second output from a battery current.

That invention resides in such apparatus comprising, in combination, a hand-held battery housing mounting the first and second electric transducers and having a pair of spaced internal battery terminal contacts, an electric transducer energizing circuit between the internal battery terminal contacts and the first and second electric transducers, including an electric switch, comprising a rotary switch actuator threaded to the battery housing for rotary and axial movement relative to the battery housing, a first switch contact part on the battery housing, a second switch contact part coupled to the rotary switch actuator and in electrical connection with the first switch contact part in a first angular and axial position of the rotary switch actuator, and out of connection from the first switch contact part in a second angular and axial position of the rotary switch actuator, and a third switch contact part coupled to the rotary switch actuator and in electrical connection with the first switch contact part in the second angular and axial position of the rotary switch actuator, and out of connection from the first switch contact part in the first angular and axial position of the rotary switch actuator. The first switch contact part is connected to one of the internal battery terminal contacts, the first electric transducer has a first terminal connected to the second switch contact part, and the second electric transducer has a first terminal connected to the third switch contact part, and the first and second electric transducers have second terminals connected to the other internal battery terminal contact.

It is an object of an invention herein disclosed and claimed to provide improved electric switches.

The invention from a first aspect of that invention resides in an electric switch, comprising, in combination, a support, a rotary switch actuator threaded to the support for rotary and axial movement relative to the support, a first switch contact part on the support, a second switch contact part coupled to the rotary switch actuator and in electrical connection with the first switch contact part in a first angular and axial position of the rotary switch actuator, and out of connection from the first switch contact part in a second angular and axial position of the rotary switch actuator, and a third switch contact part coupled to the rotary switch actuator and in electrical connection with the first switch contact part in the second angular and axial position of the rotary switch actuator, and out of connection from the first switch contact part in the first angular and axial position of the rotary switch actuator.

The invention according to a second aspect thereof resides in an electric switch, comprising, in combination, a support, a rotary switch actuator threaded on the support for rotary and axial movement relative to the support, a first switch contact part on the support, a second switch contact part on the rotary switch actuator, and a third switch contact part coupled to the rotary switch actuator and in electrical connection with the first switch contact part and out of connection from the second switch contact part in a first angular and axial position of the rotary switch actuator, and in electrical connection with the second switch contact part, and out of connection from the first switch contact part in a second angular and axial position of the rotary switch actuator.

It is an object of an invention herein disclosed and claimed to provide an improved electric light source.

The light source according to that invention comprises, in combination, a reflector having a focal point, a first electric lamp having a filament at that focal point, and a second electric lamp extending into that reflector on a side of the first electric lamp. The second electric lamp may have its own refractive lens.

It is an object of an invention herein disclosed and claimed to provide battery-powered apparatus for holding and energizing an electric transducer producing an output from a battery current.

The apparatus according to that invention comprises, in combination, a hand-held battery housing having a pair of spaced internal battery terminal contacts, a transducer housing in the form of a block of electrically conductive material threaded to the battery housing, and a switched electric transducer energizing circuit between the internal battery terminal contacts and the electric transducer. That block of electrically conductive material may have a reflector surface for the transducer.

It is an object of an invention herein disclosed and claimed to provide an improved flashlight.

That invention resides, in combination, in a light source having a base, a light source energizing circuit having an electric switch for a light source in that energizing circuit, a part of that switch releasably fastened outside of said base to a support for that part of the switch, and the light source mounted on that part, whereby the light source is disposable with that part of the switch on which it is mounted. The invention may extend to a replacement for that part of the switch, and a replacement light source mounted on the replacement for that part of the switch.

Another invention herein disclosed resides in an electric light source, comprising, in combination, a reflector having a focal point, a first electric lamp having a filament at that focal point, a second electric lamp extending into that reflector on a side of the first electric lamp, a battery, and a switching arrangement interconnected between that battery and the first electric lamp in a first position, and interconnected between that same battery and the second electric lamp in a second position of that switching arrangement.

No recitation of any feature or element in any preamble of any claim is intended to have any prior-art connotation, especially if such recitation serves to provide one or more antecedents for any feature or element in the body of a claim.

BRIEF DESCRIPTION OF THE DRAWINGS

The subject inventions and their various aspects and objects will become more readily apparent from the following detailed description of preferred embodiments thereof, illustrated by way of example in the accompanying drawings, in which like reference numerals designate like or equivalent parts, and in which:

FIGS. 3 and 4 are circuit diagrams of transducer energizing and battery charging circuits according to embodiments of an invention herein disclosed;

PREFERRED EMBODIMENTS OF THE INVENTIONS

Figure 1:
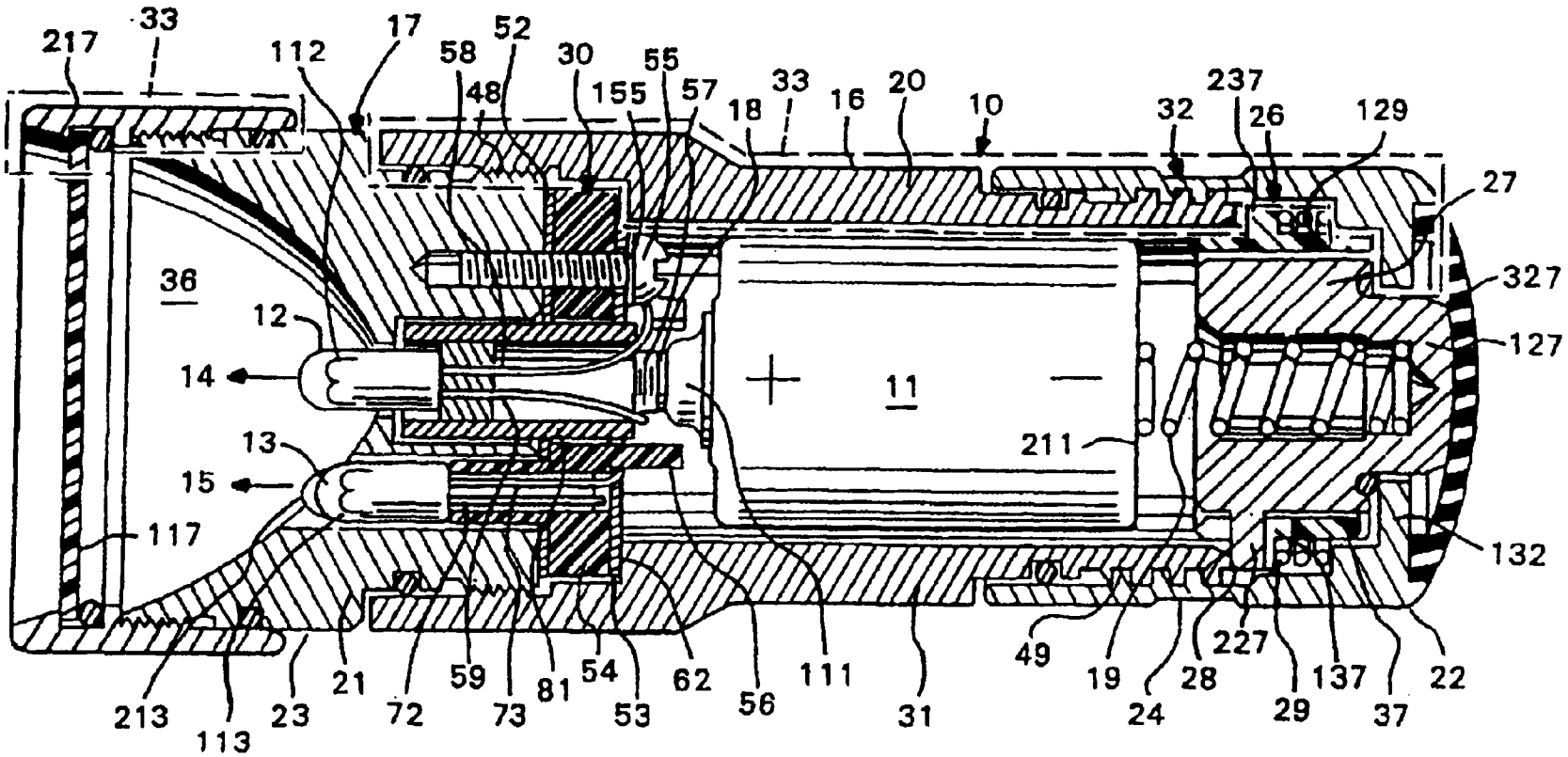
FIG. 1 is a longitudinal section of a flashlight embodying inventions herein disclosed.

The drawings show battery-powered apparatus 10 for holding and energizing an electric transducer producing an output from a battery current. One or more batteries 11 may be held in the battery housing. Apparatus within the scope of the invention include flashlights, laser pointers, electrically powered tools, and other devices. Accordingly, the transducer may include one or more light bulbs 12 and/or 13, laser diodes or other battery energized light sources, electric screw drivers or other torque converters, or other electric actuated tools or devices. The output correspondingly may be a high or low beam or other light output 14 and/or 15, or a torque or other physical quantity, but no limitation in this respect is intended hereby.

The apparatus 10 has a hand-held battery housing 16 carrying a transducer mount 17. A first internal battery terminal contact 18 is located at the transducer mount. A second internal battery terminal contact 19 is remote from the transducer mount, as seen, for instance, in FIG. 1. An electric transducer energizing circuit 20 may extend between the internal battery terminal contacts 18 and 19 and the electric transducer 12 or transducers 12 and 13.

The apparatus further includes a battery charging circuit 21 and 22 having a first external battery charge terminal 23 on the transducer mount 17 and a second external battery charge terminal 24 on a part of the battery housing, such as more fully disclosed below.

The apparatus moreover includes an electric switching arrangement in the electric transducer energizing circuit 20 and in the battery charging circuit 21 and/or 22 and interconnected between one of the internal battery terminal contacts 18 and 19 and the electric transducer 12 in one position and interconnected between corresponding ones of these internal battery terminal contacts and of the external battery charge terminals 23 and 24 and disconnected from the electric transducer 12 in another position of that switching arrangement.

In particular, the apparatus 10 has a double-throw switch 26 having a common element 27 electrically connected to one of the first and second internal battery terminal contacts, such as the internal battery terminal contact 19 as in FIG. 1.

That switch also has a first switched contact 28 leading to a first terminal of the electric transducer, such as via the transducer energizing circuit 20. That switch 26 further has an opposite second switched contact 29 electrically connected to one of the first and second external battery charge terminals, such as to the external battery charge terminal 24 as shown in FIG. 1.

In practice, the switch 26 may be located either at the transducer mount 17 or remote from the transducer mount as shown in FIG. 1.

Accordingly, an actuator for that switch may include either the transducer mount 17 or part of the battery housing. In legal terms, therefore, an actuator for the switch 26 includes one of the transducer mount 17 and part of the battery housing movable relatively to each other, such as more fully disclosed below. Current-conducting paths between the other of the first and second internal battery terminal contacts 18 and 19 and the other of the first and second external battery charge terminals 23 and 24 and a second terminal of the electric transducer 12 are provided for completing the alternative transducer energizing circuit 20 and the battery charging circuit 21 and 22.

As little as one switch may be provided within the scope of the invention. However, according to the illustrated embodiment of the invention, a second switch 30 is connected in series with the double-throw switch 26 and the electric transducer 12 or transducers 12 and 13 as more fully described below. A push-button on/off switch may also be combined with either of the switches 26 and 30 or may otherwise be in the transducer energizing circuit 20.

According to a preferred embodiment of the invention, the battery housing 16 has a barrel 31 and an end cap 32 movable relative to that barrel, and that movable end cap is the above mentioned part of the battery housing having the second external battery charge terminal 24 and being the actuator for the double-throw switch 26.

By way of example, the end cap 32 is of electrically conductive material having an exposed portion constituting one external battery charge terminal 24 on an outside of that end cap and connected to the second switched contact 29 through and by the electrically conductive material from an inside of the end cap to the exposed portion on the outside of that end cap 32.

The electrically conductive end cap 32 is electrically insulated from the barrel 31. Part of the end cap may be of electrically insulating material for this purpose or may have a coating of electrically insulating material.

Alternatively or additionally, the barrel may be coated with electrically insulating material.

In this respect, the barrel 31, including its internal and external threads should be considered coated with a layer of electrically insulating material 33 which, for instance, may be an anodization layer if the barrel is of aluminum. To avoid cluttering of the drawings, that layer has only been shown partially by dashed lines at 33 in FIG. 1, but should be understood to cover particularly the internal and external threads at the barrel ends.

Alternatively or additionally, at least the external thread of the transducer mount 17 and the internal thread of the end cap 32 may be anodized or otherwise coated with a layer of electrically insulating material (not shown to avoid crowding).

The first external battery charge terminal 23 on the transducer mount is electrically connected through that transducer mount 17 to the first internal battery terminal contact 18, such as through a conductor 52.

According to a preferred embodiment of the invention, the transducer mount 17 is of electrically conductive material constituting the first external battery charge terminal 23 on an outside of that transducer mount and connected to the first internal battery terminal contact 18 through and by that electrically conductive material from an inside of that transducer mount to the outside of that transducer mount.

Where the transducer mount is anodized or otherwise provided with a coating of insulating material, such coating is removed to provide the external battery charge terminal 23, and is also removed for contact with the conductor 52 that leads to the battery terminal contact 18.

In practice, both the first and second battery charge terminals 23 and 24 may be blank portions of the transducer mount 17 and the end cap 32, respectively.

According to what may also be a separate invention applicable to all kinds of flashlights and other transducer apparatus, the transducer mount 17 is in the form of a block of electrically conductive material threaded to the battery housing 16 and connected to the first internal battery terminal contact 18. That block of electrically conductive material 17 preferably has a reflector surface 36 for the transducer 12 or output 14.

The switch actuator 17 or 32 is threaded to the battery housing 16 or barrel 31 for rotary and axial movement relative to that battery housing or barrel. The expression "threaded to" in this respect is intended to be broad enough to cover "threaded in" as in the case of the transducer mount 17, "threaded on" as in the case of the end cap 32, to name two examples.

Even though the switch 26 may be associated with the threaded or rotatable transducer mount 17, its elements are specifically shown for the case in which the threaded switch actuator is a threaded end cap 32 of the battery housing.

In particular, the double-throw switch 26 has a common element 27 coupled to the threaded switch actuator 32 and in electrical connection with the first switched contact 28 and out of connection from the second switched contact 29 in the first angular and axial position of the threaded switch actuator shown in FIG. 1.

In that case, the transducer energizing circuit 20 is connected to the second battery terminal contact 19 via the common switch element 27 held by the screwed-on end cap 32 via a lip or annulus 132 in engagement with the first switched contact 28 located on a portion of the battery housing 16 such as the preferably electrically conductive barrel 27, against the bias of the second battery terminal contact or spring 19.

The switch 26 may thus be used to turn at least the transducer 12 on and off by rotation and counterrotation of the end cap 32, unless there is another switch 30 in series therewith for that purpose. However, the switch 26 in either case has the important purpose of positively disconnecting any transducer 12 or 13 from the battery 11 so as to prevent any battery charging current at its typically higher battery charging voltage from reaching and thereby endangering any transducer 12 and 13.

Figure 2:
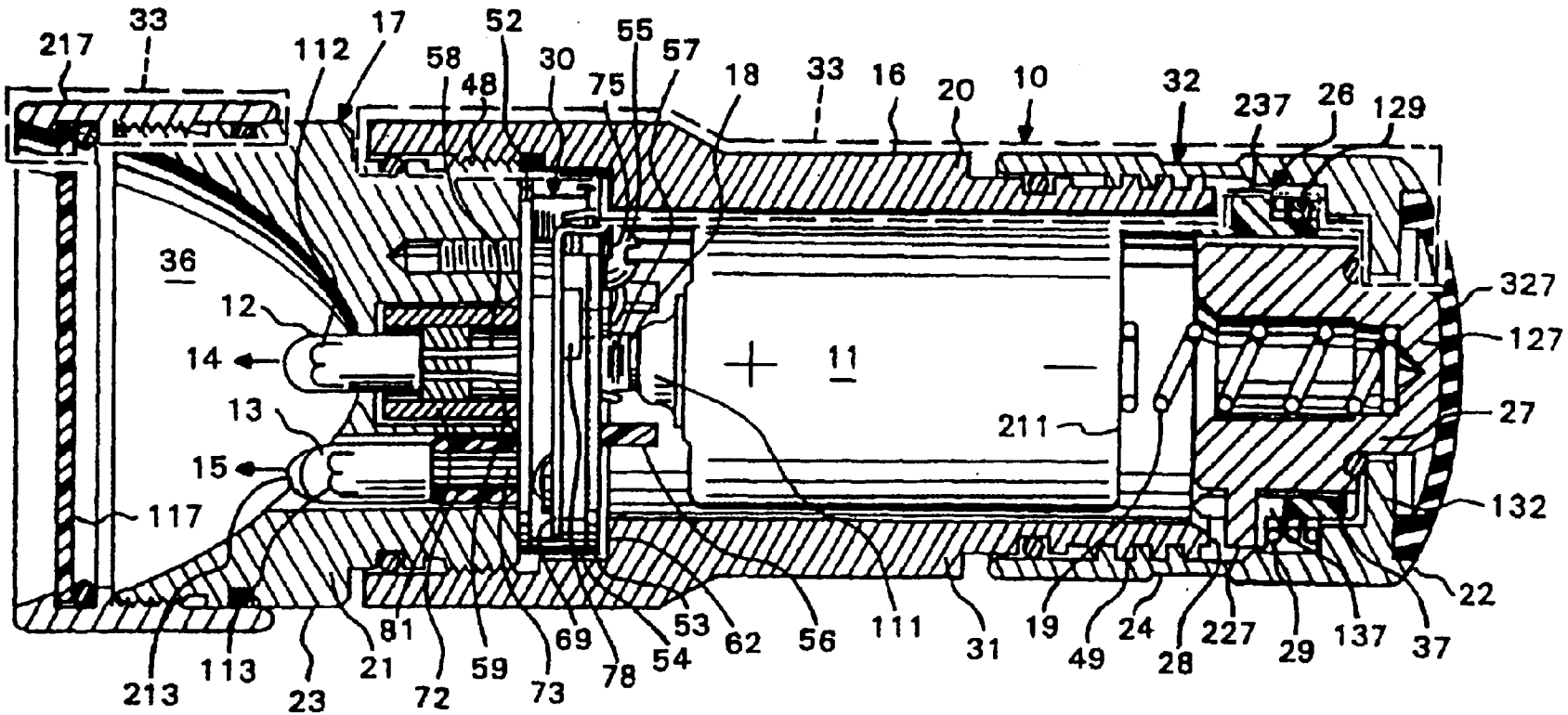
FIG. 2 is a view similar to FIG. 1, showing lamp module and tailcap assemblies in advanced axial positions.

Accordingly, if the common switch element 27 is in electrical connection with the second switched contact 29 in the second angular and axial position of the threaded switch actuator shown in FIG. 2, then it positively is out of connection from the first switched contact 28.

A push-button on/off actuator 127 may be coupled to or integral with the common switch element 27 in circumvention of the threaded switch actuator or end cap 32. According to FIG. 1, the common switch element 27 has a manually engageable portion 127 extending through an aperture in the end cap or its annulus 132. The expression "manually engageable" is intended to be broad enough to cover engagement through a sealing diaphragm 327 or similar device that may be part of the resulting on/off push-button shown in FIG. 1 and schematically in FIGS. 3 and 4 at 127.

At least the transducer 12 may thus be flashed on by depression of the push-button 127 and thereby of the common switch element 27 into engagement with the first switched contact 28 on the transducer energizing circuit 20. However, even then is that common element 27 positively disconnected from the battery charging circuit 22 at the second switched contact 29 as seen in FIG. 1.

In particular, the illustrated second switched contact 29 preferably is coupled to the threaded switch actuator or end cap 32. That second switched contact preferably is in the threaded end cap and the common element 27 is between the first and second switched contact 28 and 29 and is coupled to the threaded end cap 32.

Figure 6:
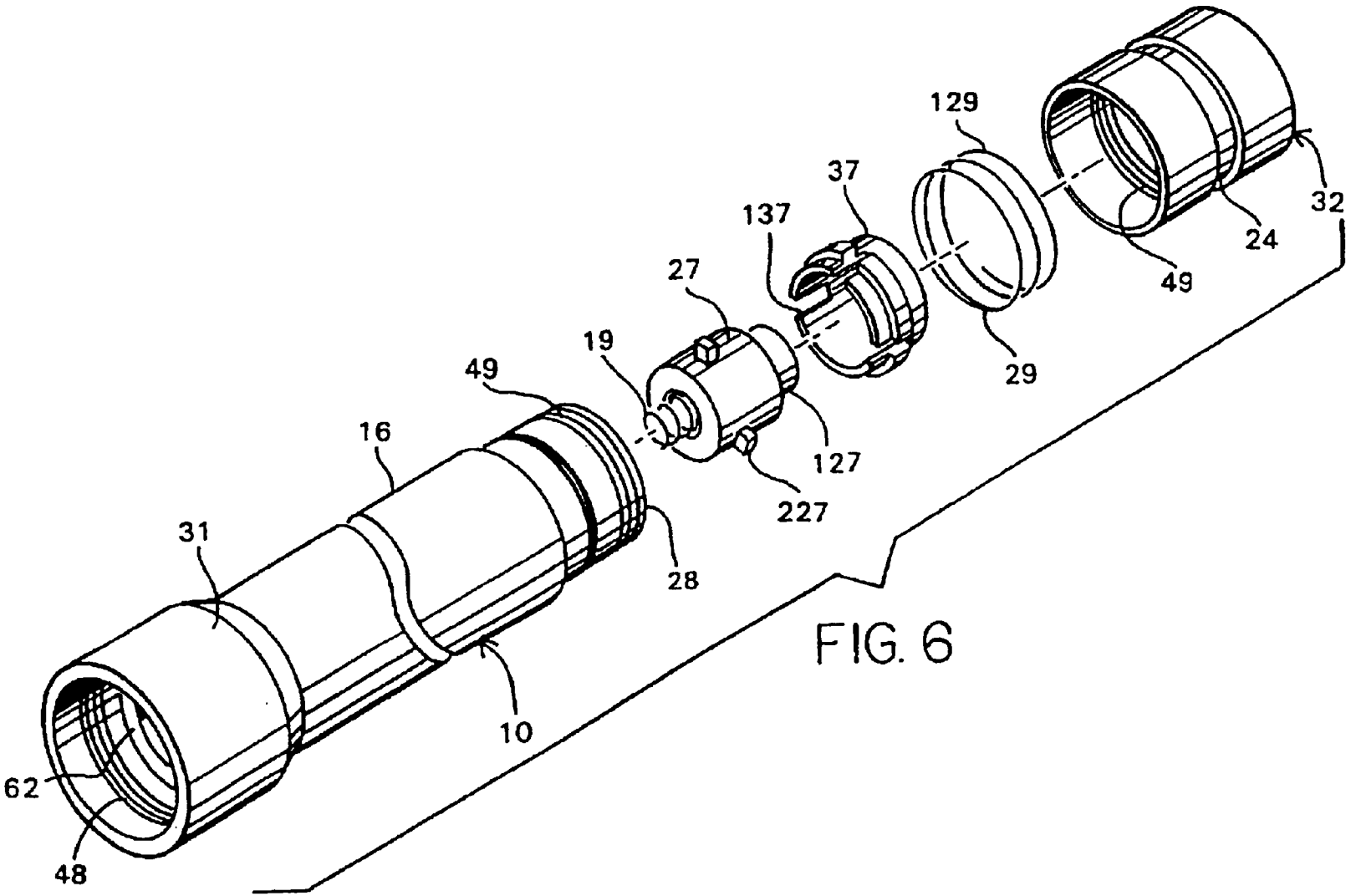
FIG. 6 is an exploded view of an electric switch incorporated by way of example in the rear end assembly of the battery housing of the flashlight of FIGS. 1 and 2, and embodying inventions herein disclosed.

The second switched contact preferably has a conducting resilient portion, such as in the form of a second spring 129. The preferred double-throw switch 26 includes an insulating spacer 37 maintaining the resilient portion 129 and thereby the second switched contact 29 out of connection from said common element 27 in the first angular and axial position of the threaded switch actuator as shown in FIG. 1. The second spring or resilient portion 129 acts on the insulating spacer 37, such as on its lateral projections 237 seen in FIGS. 1, 2 and 6. In this respect, the common switch element 27 also has one or more lateral projections 227 where it engages the first switched contact 28 in the position shown in FIG. 1 or alternatively the second switched contact 29 in the position shown in FIG. 2. The projections 227 ride in corresponding slots 137 of the insulating spacer 37. The height of the lateral projection or projections of the electrically conductive common switch element 27 is less in axial direction than the height of the lateral projections of the insulating spacer 37, whereby that insulating spacer is able to keep the second switched contact 29 away from the common switch element 27 in the first position of the threaded cap 32 shown in FIG. 1.

On the other hand, the threaded switch actuator or end cap 32 releases the common element 27 into electrical connection with the conducting resilient portion 129 or second switched contact 29 in circumvention of the insulating spacer 37 upon actuation to the second angular and axial position shown in FIG. 2. The spring of the second internal battery terminal contact 19 may for this purpose be stronger than the spring 129 of the second switched contact 29.

The schematic of FIG. 3 may now be considered. The battery 11 is shown as inserted in the battery housing or barrel 31 with the positive and negative battery terminals 111 and 211 in electric contact with the internal positive and negative battery terminal receiving contacts 18 and 19, respectively.

As apparent from FIG. 3, the electric switching arrangement 26 is in the electric transducer energizing circuit 20 and in the battery charging circuit 22 and is interconnected between the second internal battery terminal contact 19 and the electric transducer 12 in one position 41 of its common switch element 27, and is interconnected between that second internal battery terminal contact 19 and the second external battery charge terminals 24 in another position 42 of that common element 27 of switching arrangement 26, while being then positively disconnected from the transducer energizing circuit.

In this manner, the presently disclosed aspect of the invention achieves the important goal of:

a. keeping any transducer 12, 13, etc., isolated from any and all battery chargers and charging current, even if the user accidentally turns on a second transducer energizing switch (e.g. 30); and b. keeping any second transducer energizing switch (e.g. 30) out of the battery charging circuit (e.g. 21 and 22), thereby avoiding the need of users having to set two switches in series before charging can take place and thereby avoiding the charging current limitations imposed by prior-art systems which charge through a flashlight filament.

c. while leading any and all battery charging currents through parts 21 and 22 of the apparatus 10, without the need of any electrodes, wires and the like that would have to be electrically insulated from the apparatus part through which the particular electrode or wire proceeds, and d. while also avoiding a shorting of any battery charger through any faulty switch position.

By way of example, the switch 26 may be a single-pole double-throw switch, with or without an open third position for deenergization of the transducer or of the battery charging circuit in alternate switch positions 41 and 42. In this respect, the expression "double throw" is intended to be broad enough to cover "triple-throw" or "multithrow."

A push-button on/off switch 127 for the transducer 12 or transducers 12 and 13 may also be in the electric transducer energizing circuit 20, such as in a third position 43 of the switching arrangement 26, in which case the switch 26 may be a triple-throw switch, such as shown in FIGS. 3 and 4. In this respect, the common element 27 may have a third or rest position which is symbolically illustrated at 43 in FIGS. 3 and 4 and which in the illustrated embodiment would be between the first switched contact 28 and the second switched contact 29 in a third angular and axial position of the threaded switch actuator 32 or in between the first position shown in FIG. 1 and the second position shown in FIG. 2.

The switching arrangement 26 may be implemented at or about the location of the switch 30, such as in the context of the battery charge terminal 23, in which case the other battery charge terminal 24 may be directly connected to the battery terminal contact or spring 19.

Within the scope of the invention, the switch 30 may be omitted, especially if there is only one transducer, and the switch 26 may then perform the function of a first switching arrangement in the electric transducer energizing circuit 20, such as when the switch 26 is in position 41 or 43, and the function of a second switching arrangement in the battery charging circuit 22, such as when the switch 26 is in its position 42.

On the other hand, the switch 30 may be provided in the electric transducer energizing circuit 20 in series with the switch 26, whereby the user has the option to switch the transducer either with the switch 30 or with the switch 26 with or without an on-off push-button 36 or 127. As seen in FIG. 3, the switch 30 may then be a simple on/off switch in series with the first switched contact 28 of the double- or triple-throw switch 26.

The switch 30 is particularly useful if the electric transducer includes a first transducer element 12 providing a first output 14, and a second transducer element 13 providing a different second output 15, such as shown in FIGS. 1 and 4 or otherwise. In that case, the first electric switching arrangement may include an at least two-position transducer element electric switch 30 interconnected between the electric transducer energizing circuit 20 and the first transducer element 12 in a first position 45, and interconnected between that electric transducer energizing circuit and the second transducer element 13 in a second position 46 of that transducer element electric switch 30.

The switch 30 may be a rotary switch and may in fact be actuated by rotation or angular movement of the transducer mount 17 which may be threaded to the battery housing 16 or hand-held barrel 31 by mating threads 48 which preferably are electrically insulated from each other. A similarity to the cap 32 which is threaded onto that hand-held barrel 31 of the battery housing 16 by mating threads 49 which preferably are electrically insulated from each other may be noted in this respect.

FIGS. 3 and 4 by way of example indicate possible angular positions of the end cap 32 and of the transducer mount 17 relative to the barrel 31 for different switch positions 41 to 43 and 45 to 47 and 147 in terms of degrees of angular movement.

In addition to or even apart from, what has been disclosed so far, the electric switch 26 may be seen as an embodiment of yet another invention, comprising, in combination, a support 16, a rotary switch actuator 32 threaded on that support for rotary and axial movement relative to that support, a first switch contact part 28 on that support, a second switch contact part 29 on or in the rotary switch actuator, and a third switch contact part 27 coupled to that rotary switch actuator 32 and in electrical connection with the first switch contact part 28 and out of connection from the second switch contact part 29 in a first angular and axial position 41 of the rotary switch actuator, and in electrical connection with the second switch contact part 29, and out of connection from the first switch contact part 28 in a second angular and axial position 42 of the rotary switch actuator 32.

The push-button on/off actuator 127 may be coupled to the third switch contact part 27 in circumvention of the rotary switch actuator 32. By way of example, the third contact part 27 and the push-button 127 may be integral in the form of a plunger, such as shown in FIGS. 1 and 2.

The second switch contact part 29 may have a conducting resilient portion. By way of example, the second switch contact part may be a spring at 129 abutting and in electrical contact with an exposed internal surface of the electrically conductive end cap or rotary switch actuator 32 leading to the battery charging electrode 24.

The electric switching arrangement 26 preferably includes an insulating spacer 37 maintaining the resilient portion 29 or spring 129 out of connection from the third switch contact part 27 in the first angular and axial position 41 of the rotary switch actuator 32. That spring 129 or resilient portion 29 acts on the insulating spacer 37, such as by biasing the same against the battery housing 16 or its part 28. Since the lateral lug or lugs 237 of the insulating spacer 37 is or are longer in an axial direction than the lateral lug or lugs 227 of the third switch contact part 27, these insulating spacer lugs keep the second switch contact part spaced from the lugs of the third switch contact part, and the end cap 32 and its external electrode 24 are disconnected or isolated from the battery 11 or battery terminal 19 as long as the end cap or rotary actuator is in its first angular and axial position 41. In that case, the battery terminal 19 is connected via plunger 127, third contact part 27, its conductive lugs 227, switch contact 28, conductive housing 16 to the switch 30 for selective energization of the transducer 12 or 13.

Conversely, the rotary switch actuator 32 releases the third switch contact part 27 into electrical connection with the conducting resilient portion 29 in circumvention of the insulating spacer 37 upon actuation to the second angular and axial position 42. In that case, the end cap or actuator 32 and its electrode 24 are connected to the battery terminal 19 for a charging of the battery via electrode or terminal 24, end cap or actuator 32, resilient second switch, contact part 129-29, third switch contact part 27 at lugs 227, and battery terminal 19.

Most importantly, that third switch contact part 27 is positively disconnected from the first switch contact part 28 and thus from the transducers 12 and 13 in that second angular and axial position 42 of the rotary end cap or switch actuator 32. In this manner, damage of the transducers 12 and 13 from any battery charger is safely avoided. Also, the battery charging current is not limited by any transducer resistance. Moreover, no battery charger can be damaged through any faulty switch position on or in the flashlight or other apparatus.

The third switch contact part 27 preferably has rest position between the first switch contact part 28 and the second switch contact part 29 in a third angular and axial position 43 of the rotary switch actuator 28. In that rest position, the third contact part 27 or its lugs 227 are spaced from both the first contact part 28 and the second contact part 29. However, the electric switching arrangement 26 preferably includes a push-button or other linear switch actuator 127 connected to or integral with the third switch contact part 27 to turn the transducer 12 or 13 on and off by depression and release of that actuator 127.

In general terms it may be said that the switch 26 includes a spring 19 biasing the third switch contact part 27 away from said first contact part 2E. That spring may or may not be a battery terminal, depending on the use to which the switch is put.

The third switch contact part 27 has spaced contact portions engaging the first switch contact part 28 against a bias of the spring 19 in the first angular and axial position 41 of the rotary switch actuator 32, and engaging the second switch contact part 29 in the second angular and axial position 42 of that rotary switch actuator 32. The insulating spacer 37 is between the second and third switch contact parts 29 and 27 in the first angular and axial position 41 of the rotary switch actuator 32 and in any third angular and axial position 43 of that rotary switch actuator 32 between its first and second angular and axial positions 41 and 42. The spacer 37 preferably has or is in the form of a sleeve isolating and insulating the plunger part of the third contact part 27 also from the end cap or rotary switch actuator 32, as may be seen from FIGS. 1, 2 and 6.

Figure 5:
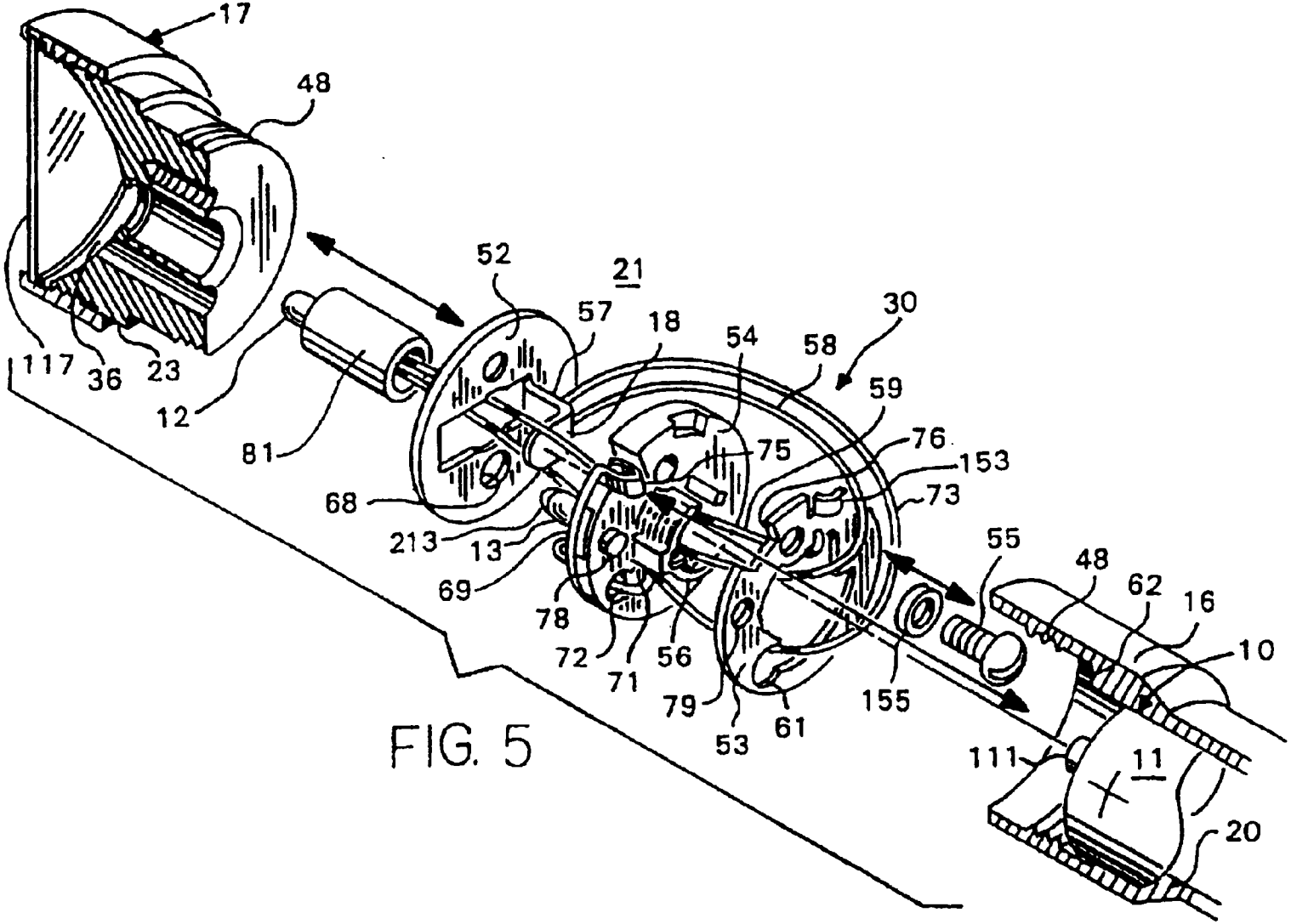
FIG. 5 is an exploded view of an electric switch incorporated by way of example in the front end assembly of the flashlight of FIGS. 1 and 2, and embodying inventions herein disclosed.

The battery-operated apparatus may be a flashlight 10 comprising a light source 12 or 13 having a base 81 or a similar base around leads 72 and 73, and a light source-energizing circuit 20 having an electric switch 30 for a light source, such as 12 or 13 in that energizing circuit. A part of that switch is releasably fastened outside of such base to a support for that part of the switch 30. While the embodiment or invention currently being described is applicable to all kinds of flashlights and switches, FIGS. 1, 2 and 5 show a switch part or contact carrier 54 as releasably fastened to a support or mount 17, such as with a screw or other fastener 55 that preferably is insulated from any switch contact 53, such as with the aid of an insulating washer 155, or by making the fastener 55 of insulting material.

The light source 12 or 13 is mounted on the part such as 54, whereby that light source is disposable with that part of the switch on which it is mounted.

Accordingly, if the light source 12 and 13 burns out, the switch support or transducer mount 17 may be unscrewed, the fastener removed, and the burned-out light source 12 and/or 13 discarded along with the switch part, such as 54, on which it is mounted.

FIG. 2 as against FIG. 1, for instance, may be taken as showing a replacement for the part 54 of the switch, and a replacement light source 12 and/or 13 mounted on that replacement for that part of the switch 30, since the parts 54 and light sources 12 and/or 13 are identical in FIGS. 1 and 2.

Indeed, it is a special advantage of the currently discussed aspect of the invention that the light sources and their replacement 12 may be pre-focused on their supporting switch parts 54 with respect to the reflector 36, so that simple manipulation of a fastener 55 will suffice to have a fresh light source focused in its place in the reflector 36 by simple tightening of the fastener 55. This in contrast to those prior-art flashlights in which the light output deteriorates when a light bulb is replaced, since the filament of the replacement bulb frequently is out of focus with the reflector.

Where the switch 30 has a switch actuator 17 for the part 54 on which the light source 12 or 13 is mounted, that part of the switch may be mounted on that switch actuator as the above mentioned support.

Where the flashlight has a reflector module 17, the part 54 of the switch may be mounted on that reflector module 17 as the above mentioned support, and the light source 12 or 13 extends into that reflector module, which may be a switch actuator for the part 54 on which the light source 12 or 13 is mounted.

By way of example, the battery housing 16 or barrel 31 may be seen as a module support bearing the reflector module 17, with that reflector module being movable relatively to that module support 31. The switch 30 then may have a first contact 62 on that module support 31 and in the light source energizing circuit 20. The part 54 of the switch may have a second contact 53 in engagement with that first contact 62 in the first position of the reflector module 17 shown in FIG. 1 relative to the module support 31, but disengaged from that first contact 62 in the second position of the reflector module 17 shown in FIG. 2 relative to the module support 31. The light source 12 is connected to that second contact 53 in the light source energizing circuit 20.

The disposable part 54 of the switch has a third contact 52 or 18 in the light source energizing circuit 20, and the light source 12 may be connected between such second and third contacts, such as via leads 58 and 59. The reflector module 17 may be threaded to the module support 31, such as at 48, for rotational and axial movement relative to that module support, and the first position, such as shown in FIG. 1, is a first rotational and axial position of that reflector module 17 relative to the module support 31, whilst the second position shown in FIG. 2 is a second rotational and axial position of that reflector module 17 relative to its module support 31.

The reflector 36 preferably is a parabolic reflector for optimized or high power light output 14 of the lamp 12.

If different light outputs 14 and 15 are desired, a light bulb with high-beam and low-beam filaments could be used. However, according to the preferred embodiment shown in FIGS. 1, 2, 4 and 5, the flashlight has two separate lamps 12 and 13, one high power, the other low power, and both lamps are mounted in a single reflector 36, with the higher power lamp 12 *mounted in a central opening in the reflector and* having its filament 112 located at the focus of the reflector, and thus having its beam 14 focused by that reflector, and the lower power lamp 13 being mounted off to the side of the high power lamp 12 *in a second opening in the reflector* and thus out of focus in the reflector 36. In consequence, the low power lamp 13 does not use the reflector to focus its beam 15, but instead may use a lens 117 on the front of the transducer mount 17. According to a preferred embodiment of this aspect of the invention, there is a refractive lens 213 for the second or low power lamp 13, which may be directly on that lamp for focusing its beam. *As shown in FIGS. 1 and 2, the lower power lamp 13 is oriented for generating its light beam 15 along a generally similar direction as the light beam 14 of the higher power lamp 12. For example, as shown in FIGS. 1 and 2, the higher and lower power lamps 12 and 13 may be oriented substantially parallel to one another, pointing in substantially the same direction. As further shown in FIGS. 1 and 2, the lower power lamp 13 is recessed in its reflector opening with its refractive lens 213 exposed in the reflector 36, preferably with its refractive lens 213 adjacent to the reflector 36 at the reflector opening in which the lower power lamp 13 is recessed.*

Compared to using a single lamp with two filaments, which will produce a well-focused narrow beam from one filament and a very poorly focused irregular beam with dark rings and spots from the other filament, the illustrated preferred embodiment not only produces a well-focused narrow beam 14 from the higher power lamp 12, but also can produce a well-focused but broad beam 15 from the lower powered lamp 13.

According to the invention presently under consideration, an electric light source comprises a reflector 36 having a focal point (at 112), a first electric lamp 12 having a filament 112 at that focal point, and a different second electric lamp 13 extending into that reflector 36 on a side of the first electric lamp 12, such as shown in FIG. 1, for instance. There also may be a refractive lens 213 for the second electric lamp 13, but not for both lamps. As seen in FIG. 1, the lens 213 is on the second or low-beam lamp 13 only, and the component 117 is only a flat reflector cover backed by a sealing O-ring and retained by a front-end cap or bezel 217. In that manner, the second lamp 13 has a clearly defined output 15 as well, without the prior-art light and dark ring pattern and other discontinuities.

Where the electric light source has a moveable housing, such as the transducer mount 17, and first and second lamps 12 and 13, the switching arrangement 30 may have a switch actuator coupled to that moveable housing or transducer mount 17. For example, if the lamp housing is rotatable in the battery housing 16, such as through mating threads 48, the switching arrangement 30 may be a rotary switch coupled to and actuated by rotation of the lamp housing between first, second and third positions 45, 46, 47, for instance.

FIGS. 1, 2 and 5 show a special switch 30 that may be used in the flashlight or other apparatus 10. That switch 30 may be used with a single light bulb, filament or other transducer 12 or for two such transducers 12 and 13.

The switch 21 according to FIGS. 1 and 5 comprises two contact discs 52 and 53 of which one, such as the disc 52, may be considered the positive contact disc, and the other, such as the disc 53, may be considered the negative contact disc, depending, however, on the polarity or orientation of the battery 11, which is shown with the positive battery terminal 111 in FIGS. 1, 2 and 5, and with the negative terminal 211 in FIGS. 1 and 2. The disc 53 may be considered the switching disc.

A disc carrier or insulating disc 54 is sandwiched between the contact discs 52 and 53 of the special switch 30. The insulating disc preferably has a protrusion 56 which extends through the preferably annular switching disc 53 and which receives in this case the positive battery terminal 111. The above mentioned internal battery terminal contact 18 is on a protrusion or prong 57 of the transducer disc 52 forming part of the transducer energizing circuit.

When the switch 30 is assembled and the battery 11 inserted, the prong or internal battery contact 18 contacts the battery pole or terminal 111 in the battery housing 16.

The one transducer 12 has a lead 58 welded or otherwise connected to the transducer disc 52 which is electrically contacted by the positive terminal 111 of the battery 11 at the bent central protrusion of that disc. That protrusion 57 or battery terminal contact 18 and the terminal 111 of the battery 11 touch each other through the center apertures of the outer contact disc 53 and of the insulator disc 54 and are held in contact by virtue of spring pressure constantly applied to the negative end 211 of the battery pack by the spring 19 of the other battery terminal contact.

The other lead 59 of the one transducer 12 extends through apertures in the transducer disc 52 and in the insulating disc 54 to the switching disc 53 to which it is welded or otherwise connected.

When the transducer mount 17 is screwed-in snugly, the outer contact disc 53 to which the second lead 59 of the transducer is affixed, will electrically contact the battery housing 16 or transducer energizing circuit 20 through the uninsulated annular ridge 62 at the base of the internal threads 48 of the transducer mount receptacle or barrel 31. The one transducer 12 is thus energized by the battery 11 if the other switch 26 is in its first position 41, or if that other switch 26 is in its second position 43 and the push-button 127 is depressed, or if there is no other switch 26 and the internal battery terminal contact 19 is directly connected to the battery housing or transducer energizing circuit, such as through the end cap 32. In that case, the switch 30 might be the only switch of the transducer, with or without an on/off push button.

This illustrated embodiment expresses an underlying broader invention that has utility not only with flashlights and other transducer apparatus, but also in other applications where switching is required.

According to the invention presently under consideration, the electric switch 30 comprises a support 16, and a transducer mount or other rotary switch actuator 17 threaded to that support, such as at 48, for rotary and axial movement relative to that support. A first switch contact part 62 is on the support 16, such as in the form of an exposed portion on an otherwise anodized or insulated aluminum or other electrically conductive body, or such as in the form of a contact on an insulating body or support.

The switch 30 also includes a second switch contact part 53 coupled to the rotary switch actuator 17 and in electrical connection with the first switch contact part 62 in a first angular and axial position 45 of the rotary switch actuator, and out of connection from that first switch contact part in a second angular and axial position 46 of the rotary switch actuator 17. The switch 30 further includes a third switch contact part 75 coupled to the rotary switch actuator and in electrical connection with the first switch contact part 62 in the second angular and axial position 46 of the rotary switch actuator, and out of connection from that first switch contact part 62 in the first angular and axial position 45 of the rotary switch actuator 17.

According to an embodiment, the second and third switch contact parts 53 and 75 are out of connection from the first switch contact part 62 in a third angular and axial position 47 of the rotary switch actuator 17.

In this respect, FIG. 4 also indicates a position 147 between the positions 45 and 46. That position 147 may in fact be the third angular and axial position at which the switch contact parts 53 and 75 are out of connection from the first switch contact part 62. That intermediate position 147 thus may be an OFF position of the switch 30, at which both transducers or lamps 12 and 13 are deenergized. The above mentioned third position 47 may then not be necessary.

By way of example, the position 147 may be implemented as an OFF position by making the disc 53 flat so that it will disengage the first contact 62 and thereby interrupt energization of the lamp 12 before the actuator 78 permits the third contact 75 to engage the first contact 62, such as shown in FIG. 2 or at position 46 in FIG. 4.

Both lamps 12 and 13 thus would be deenergized at that point. In practice, this may not be desirable, since it could confuse the user or provide an opportunity for a supposedly switched-off flashlight to switch itself "on" through a relatively slight accidental motion between its transducer mount 17 and barrel 31, thereby unnecessarily draining the battery.

Accordingly, a preferred embodiment of the invention energizes both lamps during the transition between the first and second rotational positions of the switch actuator or rotary transducer mount 17. By way of example, the contact disc 53 may be provided with a protrusion or tang 153 which axially protrudes toward the first switch contact part 62 so as to maintain an electric contact between the switch contact parts 53 and 62 when the switch actuator or transducer module 17 is rotated away from its first rotary and axial position 45 shown in FIGS. 1 and 4.

That tang or projection is shown as an arc 153 in FIG. 4, since it maintains both contact parts 53 and 57 in contact with the first contact part and thereby lamps 12 and 13 energized, while the switch 30 switches the flashlight 10 from one lamp 12 to the other lamp 13; that is, while the switch actuator or lamp mount 17 goes through its rotational and axial position 147.

In this manner, the user, seeing both lamps 12 and 13 energized at this point, will realize that the module 17 has to be rotated further for the first lamp 12 to be turned off.

Of course, depending on the nature of the lamps or other transducers 12 and 13, it may, indeed be useful to have both transducers energized for a compound output 14 and 15.

Nevertheless, the tang 153 is short enough in axial direction relative to the third contact 75 and its actuator or lifter 78 for the first transducer or lamp 12 to be deenergized by movement of the tang 153 away from the first contact part 62 when the mount 17 reaches its rotary and axial position 46 for exclusive energization of the second transducer or lamp 13 until the mount 17 is rotated further, such as to its extreme position 47.

As also shown in the illustrated embodiment, the switch contact actuator 78 is coupled to the third switch contact part 75 and maintains that third switch contact part separated from the first switch contact part 62 in the first angular and axial position 45 of the rotary switch actuator 17.

In the illustrated embodiment under consideration, the first and second switch contact parts 62 and 53 have arcuate portions matching in the first angular and axial position of the rotary switch actuator 17, such as the annular disc 53 matching an annular or arcuate contact 62.

The third switch contact part may be in the form of, or include a projecting electric contact 75 in engagement with the first switch contact part 62 in the second angular and axial position 46 of the rotary switch actuator, and including the switch contact actuator 78 maintaining that projecting electric contact out of engagement from the first switch contact part 62 in the first angular and axial position 45 of the rotary switch actuator 17.

That switch contact actuator 78 in particular may project from the third switch contact part 69/75 toward the first switch contact part 62 in mechanical engagement with that first switch contact part in the first angular and axial position 45 of the rotary switch actuator, maintaining the projecting electric contact 75 out of engagement from that first switch contact part 62. Preferably, the second axial position 46 of the rotary switch actuator 17 is more remote from the first switch contact part 62 than the first axial position 45 of that rotary switch actuator whereby the switch contact actuator 78 is in disengagement from the first switch contact part 62 in the second rotary and axial position 46 of the rotary switch actuator, and the projecting electric contact 75 of the third switch contact part is in electrical connection with the first switch contact part 62 in that second angular and axial position of the rotary switch actuator 17.

The switch 30 may include a rotary contact carrier 54 of insulating material coupled to the rotary switch actuator 17 and bearing the second and third switch contact parts 53 and 75 and its flexible support 69 having an end remote from the free end at 75 attached to the carrier 54. The switch may include an electric terminal 18, with or without 52 and 57, coupled to at least one of the rotary switch actuator 17 and the rotary contact carrier 54.

The illustrated rotary contact carrier 54 has an aperture or hollow protrusion 56 and the first, second and third switch contact parts 62, 53, 69, 75 and 78 are clear of that aperture or hollow protrusion 56. The electric terminal 18 is contained within that aperture or hollow-cylindrical protrusion 56 in the rotary contact carrier 54. Accordingly, the electric terminal 18 either reaches through the opening at 56 to the battery terminal 111, or that battery terminal protrudes into the hollow protrusion 56, meeting the switch terminal 18 therein.

In practice, the rotary switch actuator 17 may house an electric load, such as the transducer or lamp 12, connected to one of the second and third switch contact parts 53 or 69/75 or even supported by one of these contact parts or by the contact carrier 54.

Moreover, that rotary contact carrier 54, coupled to the rotary switch actuator 17 and bearing the second and third switch contact parts 53 and 69/75, may carry a further electric load 13 connected to the other of the second and third switch contact parts 53 or 69/75. The electric terminal 18 is coupled to at least one of the rotary switch actuator 17 and the rotary contact carrier 54, such as via disc 52 and prong 57, and may be connected to the electric loads 12 and 13.

The invention presently to be discussed resides in a battery-powered apparatus 10 for holding and energizing a first electric transducer 12 producing a first output 14, and a second electric transducer 13 producing a different second output 15 from a battery current. That apparatus comprises a hand-held battery housing 16 mounting the first and second electric transducers and having a pair of spaced internal battery terminal contacts 18 and 19, and an electric transducer energizing circuit 20 between the internal battery terminal contacts and the first and second electric transducers 12 and 13, including an electric switch 30. That electric switch comprises a rotary switch actuator 17 threaded on, in or otherwise to the battery housing for rotary and axial movement relative to that battery housing 16, a first switch contact part 62 on the battery housing, a second switch contact part 53 coupled to the rotary switch actuator 29 and in electrical connection with the first switch contact part 62 in a first angular and axial position 45 of the rotary switch actuator, and out of connection from that first switch contact part 62 in a second angular and axial position 46 of the rotary switch actuator, and a third switch contact part 75 coupled to the rotary switch actuator and in electrical connection with the first switch contact part 62 in that second angular and axial position 46 of the rotary switch actuator, and out of connection from that first switch contact part in the first angular and axial position 45 of the rotary switch actuator. The first switch contact part 62 is connected to one of the internal battery terminal contacts, such as to the terminal 19 through battery housing 16 and switch 26.

The first electric transducer 12 has a first terminal at 59 connected to the second switch contact part 53, and the second electric transducer 13 has a first terminal at 72 connected to the third switch contact part 75. These first and second electric transducers have second terminals at 58 and 73 connected to the other internal battery terminal contact 18, such as via disc 52. In this respect, since FIG. 5 is an exploded view, particularly the electrically insulated leads 58, 59, and 73 have come out somewhat longer in that exploded view, than as they are in reality, more realistically shown in the assembly drawings of FIGS. 1 and 2.

As already indicated above, the rotary contact carrier 54 bears at least one of the electric transducers, lamps or loads 12 and 13. The rotary switch actuator 17 may be a transducer housing, such as in the form of the above mentioned block of material threaded to the battery housing 16 and preferably having an internal or other reflector surface 36 for the transducer or lamp 12.

Other features herein disclosed may be combined with this aspect of the invention.

Where the light source, as here, includes first and second lamps 12 and 13 mounted on the above mentioned part 54 of the switch 30, that part of the switch may include a first portion 53 in the energizing circuit 20 for switched energization of the first lamp 12, and a second portion 75 in that energizing circuit for switched energization of the second lamp 13. That switch may have a switch actuator 17 for the first and second portions 53 and 75 of the part 54 on which the first and second lamps 12 and 13 are mounted. That part 54 of the switch may be mounted on the switch actuator 17 as its support.

The flashlight may have a reflector module, such as shown at 17 and the part 54 of the switch including the first and second portion 53 and 75 may be mounted on that reflector module as a support of that part 54. The first and second lamps 12 and 13 extend into that reflector module 17, as seen in FIGS. 1 and 2.

The reflector module 17 includes a reflector 36 having a focal point (at 112). The first lamp 12 may have a filament 112 at that focal point, such as described above, while the second lamp 13 extends into that reflector 36 on a side of the first lamp 12. There may be a refractive lens 213 for the second lamp 13 only.

The reflector module 17 may be a switch actuator for the first and second portions 53 and 75 of the part 54 on which the first and second lamps 12 and 13 are mounted.

The barrel 31 may form or constitute a module support bearing the reflector module 17, and that reflector module may be movable relatively to that module support. The switch 30 then may have a first contact 62 on that module support 31 and in the light source energizing circuit 20. The above mentioned first portion of the part 54 of the switch has a second contact 53 in engagement with the first contact 62 in a first position 45 of the reflector module 17 relative to its module support and disengaged from that first contact in a second position of the reflector module relative to its module support. That second position may, for instance, be the position 147 when the tang 153 is not present, or the position 47 when that tang is present.

The second portion of part 54 of the switch has a third contact 75 in engagement with the first contact 62 in a third position 46 of said reflector module 17 relative to the module support 31 and disengaged from that first contact 62 in another position of the reflector module 17 relative to its module support. If there is a tang 153 and extra position 147, the later third position may be the position 46. If there is no tang 153, the latter other position may, for instance, be the position 47 or 147. Alternatively, the latter second and third positions may be identical, such as at 46.

The first lamp 12 is connected to the second contact 53 in the light source energizing circuit, and the second lamp 12 is connected to the third contact 75 in that light source energizing circuit 20.

The above mentioned part 54 of the switch may have a fourth contact 18 in the light source energizing circuit 20, and the first lamp 12 is then connected between the second and fourth contacts 53 and 18, such as by wires 58 and 59, whist the second lamp 13 is connected between the third and fourth contacts 75 and 18, such as by wires 72 and 73.

Where the reflector module 17 is threaded to the module support 31 for rotational and axial movement relative to that module support, the first position is a first rotational and axial position 45 of the reflector module 17 relative to its module support 31, the second position may be a second rotational and axial position 46 or 47 of that reflector module relative to its module support and the third position may be a third rotational and axial position of the reflector module relative to this module support.

When either of the first and second lamps burns out, the screw 55 is removed and the whole unit 12, 13, 18, 52, 53, 57, 69, 75, 78 is discarded and replaced by a like new unit. This will not only provide fresh lamps 12 and 13, but also fresh contacts at 18, 53 and 75 for superior long-time performance of the flashlight or other battery-operated apparatus 10.

This in contrast to the deteriorating performance from progressively corroding switch contacts and battery terminal contacts of prior-art flashlights.

Also, the replaced light bulb 12 or filament 112 will be as well focused as the light bulb or filament it replaces in the transducer mount 17 and reflector 36. For instance, when the replacement unit is manufactured, each bulb 12 may first be cemented or similarly fastened in a sleeve 81 and such sleeve may be mounted on the switch carrier 54, or in its hollow part 56, and the focus of the filament 112 may be checked and rechecked during such manufacturing procedure.

I claim:

1. Battery-powered apparatus for holding and energizing an electric transducer producing an output from a battery current, comprising in combination:

a transducer mount;

a hand-held battery housing carrying the transducer mount;

a first internal battery terminal contact at the transducer mount;

a second internal battery terminal contact remote from the transducer mount;

a first eternal battery charge terminal on the transducer mount;

a second external battery charge terminal on a part of the battery housing;

a double-throw switch having a common element electrically connected to one of the first and second internal battery terminal contacts, having a first switched contact leading to a first terminal of the electric transducer, and having an opposite second switched contact electrically connected to one of the first and second external battery charge terminals;

an actuator for said switch including one of said transducer mount and said part of the battery housing movable relatively to each other; and current-conducting paths between the other of the first and second internal battery terminal contacts and the other of the first and second external battery charge terminals and a second terminal of the electric transducer.

2. Apparatus as in claim 1, including:

a push-button actuator for said switch.

3. Apparatus as in claim 1, including:

a second switch in series with said double-throw switch and the electric transducer.

4. Apparatus as in claim 1, wherein:

said battery housing includes a barrel and an end cap movable relatively to the barrel; and said movable end cap is said part of the battery housing having said second external battery charge terminal and being said actuator for the switch.

5. Apparatus as in claim 4, wherein:

said end cap is of electrically conductive material having an exposed portion constituting said second external battery charge terminal on an outside of said end cap and connected to said second switched contact through and by said electrically conductive material from an inside of said end cap to said exposed portion on said outside of the end cap.

6. Apparatus as in claim 5, wherein:

said end cap is electrically insulated from said barrel.

7. Apparatus as in claim 4, wherein:

said switch includes a switch actuating plunger having a manually engageable portion extending through an aperture in said end cap.

8. Apparatus as in claim 1, wherein:

said first external battery charge terminal is electrically connected through said transducer mount to said first internal battery terminal contact.

9. Apparatus as in claim 7, wherein:

said transducer mount is of electrically conductive material constituting said first external battery charge terminal on an outside of the transducer mount and connected to said first internal battery terminal contact through and by said electrically conductive material from an inside of the transducer mount to said outside of the transducer mount.

10. Apparatus as in claim 1, wherein:

said transducer mount is in the form of a block of electrically conductive material threaded to the battery housing and connected to said first internal battery terminal contact.

11. Apparatus as in claim 10, wherein:

said block of electrically conductive material has a reflector surface for the transducer.

12. Apparatus as in claim 10, wherein:

said transducer mount is electrically insulated from said battery housing.

13. Apparatus as in claim 1, wherein:

said switch actuator is threaded to the battery housing for rotary and axial movement relative to the battery housing; and said common element is coupled to said threaded switch actuator and in electrical connection with the first switched contact and out of connection from the second switched contact in a first angular and axial position of the threaded switch actuator, and in electrical connection with the second switched contact and out of connection from the first switched contact in a second angular and axial position of the threaded switch actuator.

14. Apparatus as in claim 13, wherein:

said threaded switch actuator is a threaded end cap of said battery housing.

15. Apparatus as in claim 13, including:

a push-button on/off actuator coupled to said common element in circumvention of said threaded switch actuator.

16. Apparatus as in claim 13, wherein:

said second switched contact has a conducting resilient portion; and said double-throw switch includes an insulating spacer maintaining said resilient portion out of connection from said common element in said first angular and axial position of the threaded switch actuator;

said resilient portion acting on said insulating spacer; and said threaded switch actuator releasing said common element into electrical connection with said conducting resilient portion in circumvention of said insulating spacer upon actuation to said second angular and axial position.

17. Apparatus as in claim 13, wherein:

said common element has a rest position between said first switched contact and said second switched contact in a third angular and axial position of the threaded switch actuator.

18. Apparatus as in claim 13, wherein:

said first switched contact is on a portion of the battery housing; and said second switched contact is coupled to the threaded switch actuator.

19. Apparatus as in claim 13, wherein:

said battery housing has a barrel and said switch actuator is an end cap threaded on said barrel;

said first switched contact part is on an end of said barrel;

said second switched contact is in the threaded end cap; and said common element is between said first and second switched contacts and is coupled to said threaded end cap.

20. Apparatus as in claim 1, wherein:

said electric transducer includes a first transducer element providing a first output, and a second transducer element providing a different second output; and said electric transducer energizing circuit includes an at least two-position electric switch in series with said double-throw switch and with said first transducer element in a first position, and with said second transducer element in a second position of said at least two-position electric switch.

21. Battery-powered apparatus for holding and energizing a first electric transducer producing a first output, and a second electric transducer producing a different second output from a battery current, comprising in combination:

a hand-held battery housing mounting the first and second electric transducers and having a pair of spaced internal battery terminal contacts;

an electric transducer energizing circuit between the internal battery terminal contacts and the first and second electric transducers, including an electric switch, comprising a rotary switch actuator threaded to the battery housing for rotary and axial movement relative to the battery housing, a first switch contact part on the battery housing, a second switch contact part coupled to the rotary switch actuator and in electrical connection with the first switch contact part in a first angular and axial position of the rotary switch actuator, and out of connection from the first switch contact part in a second angular and axial position of the rotary switch actuator, and a third switch contact part coupled to the rotary switch actuator and in electrical connection with the first switch contact part in the second angular and axial position of the rotary switch actuator, and out of connection from the first switch contact part in the first angular and axial position of the rotary switch actuator;

said first switch contact part connected to one of said internal battery terminal contacts;

said first electric transducer having a first terminal connected to said second switch contact part;

said second electric transducer having a first terminal connected to said third switch contact part; and said first and second electric transducers having second terminals connected to the other internal battery terminal contact.

22. Apparatus as in claim 21, wherein:

said second and third switch contact parts are out of connection from the first switch contact part in a third angular and axial position of the rotary switch actuator.

23. Apparatus as in claim 21, wherein:

said switch includes a switch contact actuator coupled to the third switch contact part and maintaining that third switch contact part separated from the first switch contact part in the first angular and axial position of the rotary switch actuator.

24. Apparatus as in claim 21, wherein:

said first and second switch contact parts have arcuate portions matching in the first angular and axial position of the rotary switch actuator.

25. Apparatus as in claim 21, wherein:

said third switch contact part includes a projecting electric contact in engagement with the first switch contact part in the second angular and axial position of the rotary switch actuator, and a switch contact actuator maintaining the projecting electric contact out of engagement from the first switch contact part in the first angular and axial position of the rotary switch actuator.

26. Apparatus as in claim 25, wherein:

said switch contact actuator projects from the third switch contact part toward the first switch contact part in mechanical engagement with the first switch contact part in the first angular and axial position of the rotary switch actuator maintaining the projecting electric contact out of engagement from the first switch contact part; and wherein the second axial position of the rotary switch actuator is more remote from the first switch contact part than the first axial position of the rotary switch actuator whereby the switch contact actuator is in disengagement from the first switch contact part in the second rotary and axial position of the rotary switch actuator and the projecting electric contact of the third switch contact part is in electrical connection with the first switch contact part in that second angular and axial position of the rotary switch actuator.

27. Apparatus as in claim 21, including:

a rotary contact carrier coupled to the rotary switch actuator and bearing the second and third switch contact parts.

28. Apparatus as in claim 27, including:

said other internal battery terminal contact coupled to at least one of said rotary switch actuator and said rotary contact carrier.

29. Apparatus as in claim 27, wherein:

said rotary contact carrier has an aperture;

said first, second and third switch contact parts are clear of said aperture; and said other battery terminal contact projects at least into said aperture in the rotary contact carrier.

30. Apparatus as in claim 27, wherein:

said rotary contact carrier bears at least one of said electric transducers.

31. Apparatus as in claim 21, wherein:

said rotary switch actuator is a transducer housing.

32. Apparatus as in claim 31, wherein:

said transducer housing is in the form of a block of material threaded to the battery housing.

33. Apparatus as in claim 32, wherein:

said block of material constitutes a transducer output reflector.

34. Apparatus as in claim 31, including:

said other internal battery terminal contact coupled to the transducer housing.

35. Apparatus as in claim 21, including:

a push-button on/off switch in said electric transducer energizing circuit.

36. Apparatus as in claim 21, including:

a reflector having a focal point;

said first electric transducer being a first electric lamp having a filament at said focal point; and said second electric transducer being a second electric lamp extending into said reflector on a side of said first electric lamp.

37. Apparatus as in claim 36, wherein:

said reflector is in the rotary switch actuator.

38. An electric light source, comprising in combination:

a reflector having a focal point;

a first electric lamp having a filament at said focal point;

a second electric lamp extending into said reflector on a side of said first electric lamp; and a refractive lens for said second electric lamp.

39. An electric light source as in claim 38, including:

a movable housing for said reflector and first and second lamps; *and*

[said] *a* switching arrangement having a switch actuator coupled to said movable housing.

40. An electric light source, comprising in combination:

a reflector having a focal point;

a first electric lamp having a filament at said focal point *for generating a first light beam*;

a second electric lamp extending into said reflector on a side of said first electric lamp*, said second electric lamp oriented for generating a second light beam along a generally similar direction as said first light beam*;

a battery; and a switching arrangement interconnected between said battery and said first electric lamp in a first position, and interconnected between that same battery and said second electric lamp in a second position of said switching arrangement.

41. An electric light source as in claim 40, including:

a movable housing for said reflector and first and second lamps;

said switching arrangement having a switch actuator coupled to said movable housing.

42. An electric switch, comprising in combination:

a support;

a rotary switch actuator threaded to the support for rotary and axial movement relative to the support;

a first switch contact part on the support;

a second switch contact part coupled to the rotary switch actuator and in electrical connection with the first switch contact part in a first angular and axial position of the rotary switch actuator, and out of connection from the first switch contact part in a second angular and axial position of the rotary switch actuator; and a third switch contact part coupled to the rotary switch actuator and in electrical connection with the first switch contact part in the second angular and axial position of the rotary switch actuator, and out of connection from the first switch contact part in the first angular and axial position of the rotary switch actuator.

43. An electric switch as in claim 42, wherein:

said second and third switch contact parts are out of connection from the first switch contact part in a third angular and axial position of the rotary switch actuator.

44. An electric switch as in claim 42, wherein:

said switch includes a switch contact actuator coupled to the third switch contact part and maintaining that third switch contact part separated from the first switch contact part in the first angular and axial position of the rotary switch actuator.

45. An electric switch as in claim 42, wherein:

said first and second switch contact parts have arcuate portions matching in the first angular and axial position of the rotary switch actuator.

46. An electric switch as in claim 42, wherein:

said third switch contact part includes a projecting electric contact in engagement with the first switch contact part in the second angular and axial position of the rotary switch actuator, and a switch contact actuator maintaining the projecting electric contact out of engagement from the first switch contact part in the first angular and axial position of the rotary switch actuator.

47. An electric switch as in claim 46, wherein:

said switch contact actuator projects from the third switch contact part toward the first switch contact part in mechanical engagement with the first switch contact part in the first angular and axial position of the rotary switch actuator maintaining the projecting electric contact out of engagement from the first switch contact part; and wherein the second axial position of the rotary switch actuator is more remote from the first switch contact part than the first axial position of the rotary switch actuator whereby the switch contact actuator is in disengagement from the first switch contact part in the second rotary and axial position of the rotary switch actuator and the projecting electric contact of the third switch contact part is in electrical connection with the first switch contact part in that second angular and axial position of the rotary switch actuator.

48. An electric switch as in claim 42, including:

a rotary contact carrier coupled to the rotary switch actuator and bearing the second and third switch contact parts.

49. An electric switch as in claim 48, including:

an electric terminal coupled to at least one of said rotary switch actuator and said rotary contact carrier.

50. An electric switch as in claim 49, wherein:

said rotary contact carrier has an aperture;

said first, second and third switch contact parts are clear of said aperture; and said electric terminal is contained within said aperture in the rotary contact carrier.

51. An electric switch as in claim 42, wherein:

said rotary switch actuator houses an electric load connected to one of said second and third switch contact parts.

52. An electric switch as in claim 51, including:

a rotary contact carrier coupled to the rotary switch actuator and bearing the second and third switch contact parts and a further electric load connected to the other of the second and third switch contact parts.

53. An electric switch as in claim 52, including:

an electric terminal coupled to at least one of said rotary switch actuator and said rotary contact carrier, and connected to said electric loads.

54. An electric switch, comprising in combination:

a support;

a rotary switch actuator threaded on the support for rotary and axial movement relative to the support;

a first switch contact part on the support;

a second switch contact part on the rotary switch actuator; and a third switch contact part coupled to the rotary switch actuator and in electrical connection with the first switch contact part and out of connection from the second switch contact part in a first angular and axial position of the rotary switch actuator, and in electrical connection with the second switch contact part, and out of connection from the first switch contact part in a second angular and axial position of the rotary switch actuator.

55. Apparatus as in claim 54, including:

a push-button on/off actuator coupled to the third switch contact part in circumvention of said rotary switch actuator.

56. Apparatus as in claim 54, including:

said second, switch contact part has a conducting resilient portion; and said electric switch arrangement includes an insulating spacer maintaining said resilient portion out of connection from said third switch contact part in said first angular and axial position of the rotary switch actuator;

said resilient portion acting on said insulating spacer; and said rotary switch actuator releasing said third switch contact part into electrical connection with said conducting resilient portion in circumvention of said insulating spacer upon actuation to said second angular and axial position.

57. Apparatus as in claim 54, wherein:

said third switch contact part has rest position between said first switch contact part and said second switch contact part in a third angular and axial position of the rotary switch actuator.

58. Apparatus as in claim 57, wherein:

said electric switching arrangement includes a linear switch actuator connected to said third switch contact part.

59. An electric switch as in claim 54, including:

a spring biasing said third switch contact part away from said first contact part;

said third switch contact part having spaced contact portions engaging said first switch contact part against a bias of said spring in said first angular and axial position of the rotary switch actuator, and engaging said second switch contact part in said second angular and axial position of the rotary switch actuator.

60. An electric switch as in claim 59, including:

an insulating spacer between said second and third switch contact parts in said first angular and axial position of the rotary switch actuator and in any third angular and axial position of the rotary switch actuator between said first and second angular and axial positions.

61. Battery-powered apparatus for holding and energizing an electric transducer producing an output from a battery current, comprising in combination:

a hand-held battery housing having a pair of spaced internal battery terminal contacts;

a transducer housing in the form of a block of electrically conductive material threaded to the battery housing and connected to one of said internal battery terminal contacts; and a switched electric transducer energizing circuit between the internal battery terminal contacts and the electric transducer.

62. Apparatus as in claim 61, wherein:

said block of electrically conductive material has a reflector surface for the transducer.

63. Apparatus as in claim 61, wherein:

said transducer housing includes a first surface and a terminal connected to said first surface and to said electrically conductive material.

64. In a flashlight, the improvement comprising in combination:

a light source having a base;

a light source energizing circuit having an electric switch for a light source in said energizing circuit;

a part of said switch releasably fastened outside of said base to a support for said part of the switch; and said light source mounted on said part, whereby said light source is disposable with said part of the switch on which it is mounted;

a replacement for said part of the switch; and a replacement light source mounted on said replacement for said part of the switch.

65. A flashlight as in claim 64, wherein:

said switch has a switch actuator for said part on which the light source is mounted; and said part of the switch is mounted on said switch actuator as said support.

66. A flashlight as in claim 64, wherein:

said flashlight has a reflector module;

said part of the switch is mounted on said reflector module as said support; and said light source extends into said reflector module.

67. A flashlight as in claim 66, wherein:

said reflector module is a switch actuator for said part on which the light source is mounted.

68. A flashlight as in claim 66, including:

a module support bearing said reflector module;

said reflector module movable relatively to said module support;

said switch having a first contact on said module support and in said light source energizing circuit;

said part of the switch having a second contact in engagement with said first contact in a first position of said reflector module relative to said module support and disengaged from said first contact in a second position of said reflector module relative to said module support; and said light source connected to said second contact in said light source energizing circuit.

69. A flashlight as in claim 68, wherein:

said part of the switch has a third contact in said light source energizing circuit;

said light source connected between said second and third contacts.

70. A flashlight as in claim 68, wherein:

said reflector module is threaded to said module support for rotational and axial movement relative to said module support;

said first position is a first rotational and axial position of said reflector module relative to said module support; and said second position is a second rotational and axial position of said reflector module relative to said module support.

71. A flashlight as in claim 64, wherein:

said light source includes first and second lamps mounted on said part of the switch;

said part of the switch includes a first portion in said energizing circuit for switched energization of said first lamp, and a second portion in said energizing circuit for switched energization of said second lamp;

said switch has a switch actuator for said first and second portions of said part on which said first and second lamps are mounted; and said part of the switch is mounted on said switch actuator as said support.

72. A flashlight as in claim 64, wherein:

said light source includes first and second lamps mounted on said part of the switch;

said part of the switch includes a first portion in said energizing circuit for switched energization of said first lamp, and a second portion in said energizing circuit for switched energization of said second lamp;

said flashlight has a reflector module;

said part of the switch including said first and second portions is mounted on said reflector module as said support; and said first and second lamps extend into said reflector module.

73. A flashlight as in claim 72, wherein:

said reflector module includes a reflector having a focal point;

said first lamp has a filament at said focal point; and said second lamp extends into said reflector on a side of said first lamp.

74. A flashlight as in claim 73, including:

a refractive lens for said second lamp.

75. A flashlight as in claim 72, wherein:

said reflector module is a switch actuator for said first and second positions of said part on which said first and second lamps are mounted.

76. A flashlight as in claim 72, including:

a module support bearing said reflector module;

said reflector module movable relatively to said module support;

said switch having a first contact on said module support and in said light source energizing circuit;

said first portion of said part of the switch having a second contact in engagement with said first contact in a first position of said reflector module relative to said module support and disengaged from said first contact in a second position of said reflector module relative to said module support;

said second portion of said part of the switch having a third contact in engagement with said first contact in a third position of said reflector module relative to said module support and disengaged from said first contact in another position of said reflector module relative to said module support;

said first lamp connected to said second contact in said light source energizing circuit; and said second lamp connected to said third contact in said light source energizing circuit.

77. A flashlight as in claim 76, wherein:

said part of the switch has a fourth contact in said light source energizing circuit;

said first lamp connected between said second and fourth contacts; and said second lamp connected between said third and fourth contacts.

78. A flashlight as in claim 76, wherein:

said reflector module is threaded to said module support for rotational and axial movement relative to said module support;

said first position is a first rotational and axial position of said reflector module relative to said module support;

said second position is a second rotational and axial position of said reflector module relative to said module support; and said third position is a third rotational and axial position of said reflector module relative to said module support.

*79. An electric light source as in claim 38, wherein:*

*said second electric lamp is oriented for generating a light beam along a generally similar direction as a light beam generated by said first electric lamp.*

*80. An electric light source, comprising in combination:*

*a reflector having a focal point;*

*a lens mounted in front of said reflector;*

*a first electric lamp having a filament at said focal point for generating a first light beam;*

*a second electric lamp extending into said reflector on a side of said first electric lamp, said second electric lamp oriented for generating a second light beam through said lens along a generally similar direction as said first light beam;*

*a battery; and*

*a switching arrangement interconnected between said battery and said first electric lamp in a first position,*

*and interconnected between that same battery and said second electric lamp in a second position of said switching arrangement.*

*81. An electric light source, comprising in combination:*

*a reflector having a focal point, said reflector further having first and second openings formed therein, said first opening located at the center of said reflector, and said second opening located to the side of said first opening;*

*a first electric lamp positioned in said first opening in said reflector and having a filament at said focal point; and*

*a second electric lamp including a refractive lens, said second electric lamp recessed in said second opening in said reflector with said refractive lens of said second electric lamp exposed in said reflector.*

*82. An electric light source as in claim 81, including:*

*a movable housing for said reflector and said first and second lamps; and*

*a switching arrangement having a switch actuator coupled to said movable housing.*

*83. An electric light source as in claim 81, wherein:*

*said second electric lamp is oriented for generating a light beam along a generally similar direction as a light beam generated by said first electric lamp.*

* * * * *